US009972096B2

United States Patent
Akselrod et al.

(10) Patent No.: US 9,972,096 B2
(45) Date of Patent: May 15, 2018

(54) DETECTION OF OBSTRUCTIONS

(71) Applicant: International Business Machines Corporation, Armonk, NY (US)

(72) Inventors: Ben Z. Akselrod, Givat Shmuel (IL); Anthony Di Loreto, Toronto (CA); Steve McDuff, Toronto (CA); Kyle D. Robeson, Toronto (CA)

(73) Assignee: International Business Machines Corporation, Armonk, NY (US)

(*) Notice: Subject to any disclaimer, the term of this patent is extended or adjusted under 35 U.S.C. 154(b) by 13 days.

(21) Appl. No.: 15/182,017

(22) Filed: Jun. 14, 2016

(65) Prior Publication Data

US 2017/0358088 A1   Dec. 14, 2017

(51) Int. Cl.
    *G06K 9/00*       (2006.01)
    *G06T 7/13*       (2017.01)
    *H04N 5/225*      (2006.01)

(52) U.S. Cl.
    CPC .............. *G06T 7/13* (2017.01); *H04N 5/225* (2013.01); *G06T 2207/10028* (2013.01); *G06T 2207/30236* (2013.01); *G06T 2207/30256* (2013.01); *G06T 2207/30261* (2013.01)

(58) Field of Classification Search
    CPC .. E05F 15/00; E05F 15/668; E05Y 2900/106; G05B 2219/2628; G07C 9/00015
    USPC .............. 382/103; 701/300, 95, 301, 45, 96; 250/208.1, 221; 340/435, 436, 903
    See application file for complete search history.

(56) References Cited

U.S. PATENT DOCUMENTS

| | | | |
|---|---|---|---|
| 7,194,347 B2* | 3/2007 | Harumoto | B60R 21/0132 340/436 |
| 7,966,127 B2* | 6/2011 | Ono | B60R 21/0134 701/300 |
| 8,766,817 B2 | 7/2014 | Sri-Jayantha | |
| 2007/0078570 A1 | 4/2007 | Dai et al. | |
| 2014/0067265 A1 | 3/2014 | Maston | |
| 2017/0129489 A1* | 5/2017 | Pawlicki | B60W 30/18 |

* cited by examiner

*Primary Examiner* — Charlotte M Baker
(74) *Attorney, Agent, or Firm* — Schmeiser, Olsen & Watts, LLP; David Zwick

(57) ABSTRACT

A system and method for detecting obstructions. The system includes a camera coupled to a vehicle and configured to capture image data from a vehicle, and a computing device that includes a processor configured to: detect an edge of a roadway on which the vehicle is traveling; detect objects located proximate an edge of the roadway, based on the captured image data; determine a location of each detected object, based on the captured image data; calculate a distance between each detected object and the edge of the roadway; determine that at least one object of the detected objects is an obstruction, based on at least the calculated distance between each object of the at least one object and the edge of the roadway being below a threshold; and transmit a message to an external device, said message indicating the location of each detected object determined to be an obstruction.

20 Claims, 4 Drawing Sheets

DETECTION OF OBSTRUCTIONS

TECHNICAL FIELD

The present invention relates to detecting obstructions, and more specifically, but not exclusively, to detecting obstructions proximate a roadway from a vehicle.

BACKGROUND

Safely entering an intersection while driving requires clear visibility to avoid hazardous or dangerous situations. Obstructions to a vehicle's visibility can increase the chance of collisions between vehicles, bicycles and pedestrians by forcing drivers and automated vehicles to unsafely move into an intersection until oncoming traffic can be detected. Construction sites, temporary displays, vegetation and snow pile-up (e.g., from snow plows), and the like can serve as obstructions that limit visibility along the edges of roadways.

SUMMARY

A system, and associated method and computer program product, for detecting obstructions. The system includes a camera configured to capture image data from a vehicle, and a computing device that includes a processor configured to: detect an edge of a roadway on which the vehicle is traveling; detect objects located proximate an edge of the roadway, based on the captured image data; determine a location of each detected object, based on the captured image data; calculate a distance between each detected object and the edge of the roadway; determine that at least one object of the detected objects is an obstruction, based on at least the calculated distance between each object of the at least one object and the edge of the roadway being below a threshold; and transmit a message to an external device, said message indicating the location of each detected object determined to be an obstruction.

DETAILED DESCRIPTION

Techniques described herein provide a system for detecting obstructions and reporting any detected obstructions to an external device. An obstruction, as described herein, can include any suitable object that is within a predetermined distance from the edge of a roadway and/or any object that has a size or shape that limits the visibility of a driver. In some embodiments, the predetermined distance can be calculated based on a sight line, bylaws, and topography, etc. For example, the predetermined distance can indicate an area along the edge of a roadway that is to remain free from obstructions (also referred to herein as obstacles) to enable vehicles (e.g., automobiles, trucks, etc.) approaching an intersection to have a sufficient amount of visibility to enter the intersection. In some embodiments, the techniques described herein can be used to detect obstructions to a driver's visibility at any suitable point along a roadway regardless of whether an intersection is nearby. In some examples, the external device can include a database or cloud service. The external device can be monitored and can dispatch a service provider to address or remove a detected obstruction.

Figure 1:
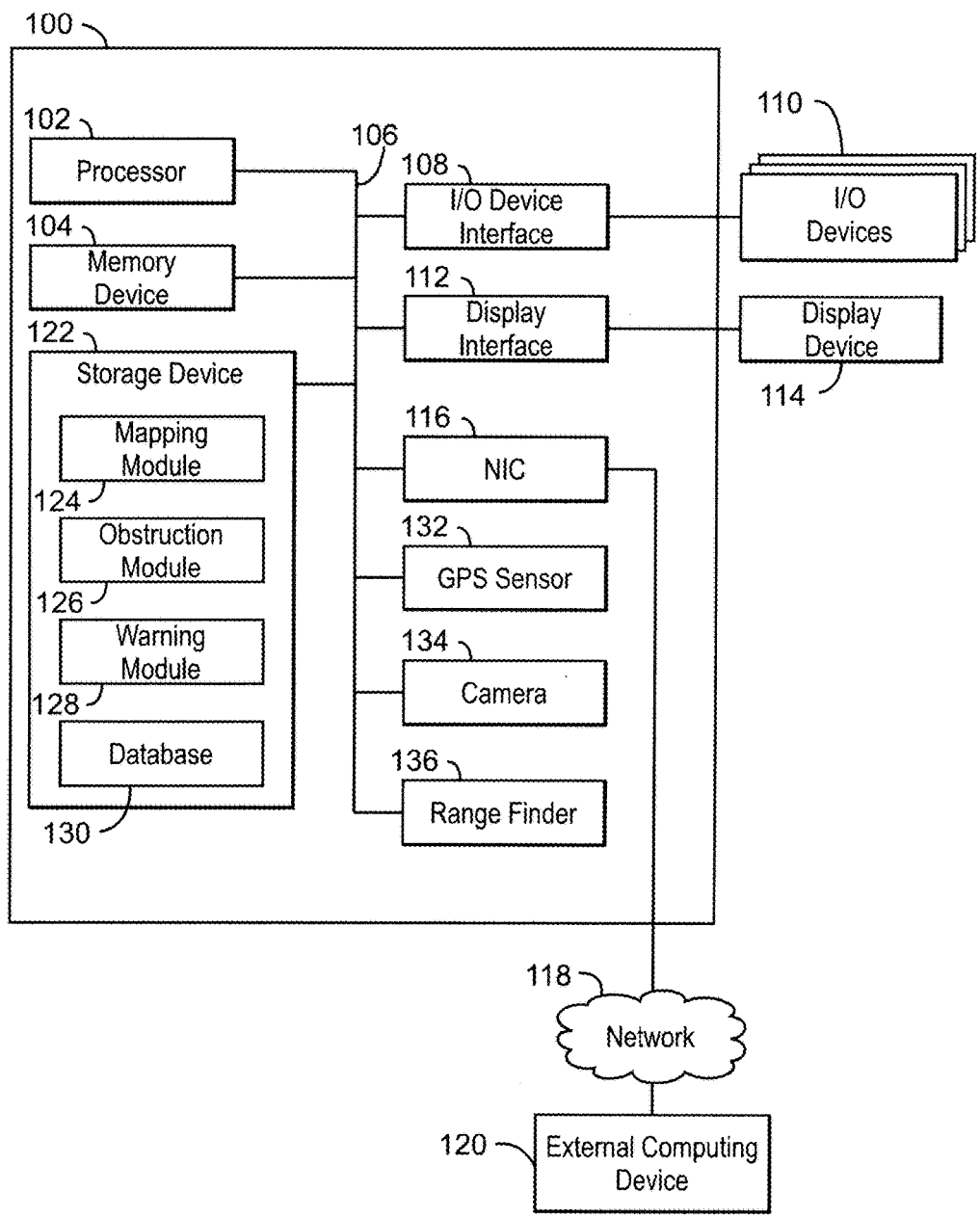
FIG. 1 depicts a block diagram of an example computing system that can detect obstructions, in accordance with embodiments of the present invention.

FIG. 1 depicts a block diagram of an example computing system 150 that can detect obstructions. The computing system 150 includes a computing device 100, one or more input/output (I/O) devices 110, a display device 114, a network 118, and an external computing device 120.

The computing device 100 may be, for example, a server, desktop computer, laptop computer, tablet computer, or smartphone. In some examples, the computing device 100 may be a cloud computing node. The computing device 100 may be described in the general context of computer system executable instructions, such as program modules, being executed by a computer system. Generally, program modules may include routines, programs, objects, components, logic, data structures, and so on that perform particular tasks or implement particular abstract data types. The computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is configured to execute stored instructions, and a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to n input/output (I/O) device interface 108 configured to connect the computing device 100 to the one or more I/O devices 110. The I/O devices 110 may include, for example, a keyboard and a pointing device, wherein the pointing device may include a touchpad or a touchscreen, etc. The I/O devices 110 may be built-in components of the computing device 100, or may be devices that are externally connected to the computing device 100.

The processor 102 may also be linked through the system interconnect 106 to a display interface 112 configured to connect the computing device 100 to a display device 114. The display device 114 may include a display screen that is a built-in component of the computing device 100. The display device 114 may also include a computer monitor, television, or projector, etc., that is externally connected to the computing device 100. In addition, a network interface controller (NIC) 116 may be configured to connect the computing device 100 through the system interconnect 106 to the network 118. In some embodiments, the NIC 116 can transmit data using any suitable interface or protocol, such as the internet small computer system interface, etc. The network 118 may be a cellular network, a radio network, a wide area network (WAN), a local area network (LAN), or the Internet, etc. An external computing device 120 may connect to the computing device 100 through the network 118. In some examples, external computing device 120 may be an external webserver. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device 122 may include a mapping module 124, an obstruction module 126, and a warning module 128. The mapping module 124 can detect an edge of a roadway on which a vehicle is traveling and detect a plurality of objects located proximate the edge of the roadway based on captured image data. Image data, as referred to herein, can include any data related to a location, orientation, position, and size of an object. In some embodiments, the obstruction module 126 can calculate a distance between each object and the edge of the roadway and determine that at least one of the objects is an obstruction based in part on the distance between at least one of the objects and the edge of the roadway being below a specified or predetermined threshold. In some embodiments, the obstruction module 126 can also determine a shape and size of an object proximate the edge of a roadway. In some examples, the warning module 128 can transmit a message to an external device (e.g., the external coupling device 120), wherein the message indicates a location of each object determined to be an obstruction.

The scope of an object "proximate" the edge of a roadway is governed, at least in part, by the object being a visual obstruction that impairs visibility, from a vehicle (e.g., automobiles, trucks, etc.) on the roadway or entering the roadway, of other vehicles (e.g., automobiles, trucks, bicycles, etc.) and/or pedestrians.

In some embodiments, the computing device 100 can be located in an automated vehicle and the warning module 128 can indicate to the external computing device 120 that the automated vehicle cannot navigate an intersection, or any other suitable portion of a roadway, due to an obstruction proximate an edge of a roadway. In some embodiments, the computing device 100, or more specifically the storage device 122, can also include a database 130 that stores data corresponding to a street layout for a region, a global positioning satellite (GPS) sensor 132, a camera 134, and a spatial range finder 136. In some examples, the camera 134 can capture data, such as photographs and/or video, of the surrounding environment when the computing device 100 approaches an intersection. In some examples, the computing device 100 can use data from the GPS sensor 132 and the database 130 to detect when the computing device 100 approaches an intersection. For example, the GPS sensor 132 can indicate the position of the computing device 100 based on information received from a plurality of global positioning satellites and the database 130 can indicate surrounding roadways based on the position from the GPS sensor 132. Once the computing device 100 reaches a specific distance from an intersection, the range finder 126 can scan the area around the intersection and use data captured by the camera 134 to determine if there are obstructions that block the vision of a perpendicular street. In some embodiments, obstructions can be detected along any portion of a roadway. In some examples, the range finder 136 can calculate a distance between each object and the edge of the roadway and the range finder 136 can be replaced with a system of cameras that can detect depth. In one embodiment, the data from the GPS sensor 132, the range finder 136, and the camera 134 can be processed by the external computing device 120, such as a centralized server in a cloud service.

In some embodiments, the camera 134 can be mounted at a predetermined location on a vehicle based on a ride height of the vehicle. The ride height, as defined herein, is a distance between the base of a tire of a vehicle and the underside of a chassis of the vehicle. In some examples, the camera 134 can be mounted at a location on a vehicle at a camera height equal to, or greater than, the sum of the ride height, the height of the driver's seat above the underside of the chassis of the vehicle, and the average height of a driver above the driver's seat. Mounting a camera 134 at this camera height can enable the camera to capture data that corresponds to what a driver may see which simulates a driver's experience. In some examples, a field of view of the camera 134 can include any suitable range and can exceed ninety degrees. In some embodiments, the camera 134 can move horizontally in relation to a vehicle to capture image data from different heights. In some embodiments, the image data captured from different heights in one or more vehicles can be aggregated locally at the computing device 100 or remotely at the external computing device 120 to provide additional information pertaining to an object.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the mapping module 124, obstruction module 126, and warning module 128 may be partially, or entirely, implemented in hardware and/or in the processor 102. For example, the functionality may be implemented with an application specific integrated circuit, logic implemented in an embedded controller, or in logic implemented in the processor 102, etc. In some embodiments, the functionalities of the mapping module 124, the obstruction module 126, and the warning module 128, can be implemented with logic, wherein the logic, as referred to herein, can include any suitable hardware (e.g., a processor, etc.), software (e.g., an application, etc.), firmware, or any suitable combination of hardware, software, and firmware.

In one embodiment, the computing device 100 of the present invention is a special purpose hardware device dedicated to detecting obstructions, due to an inclusion therein of special purpose hardware which may include the GPS sensor 132, the camera 134 and/or the range finder 136.

Figure 2:
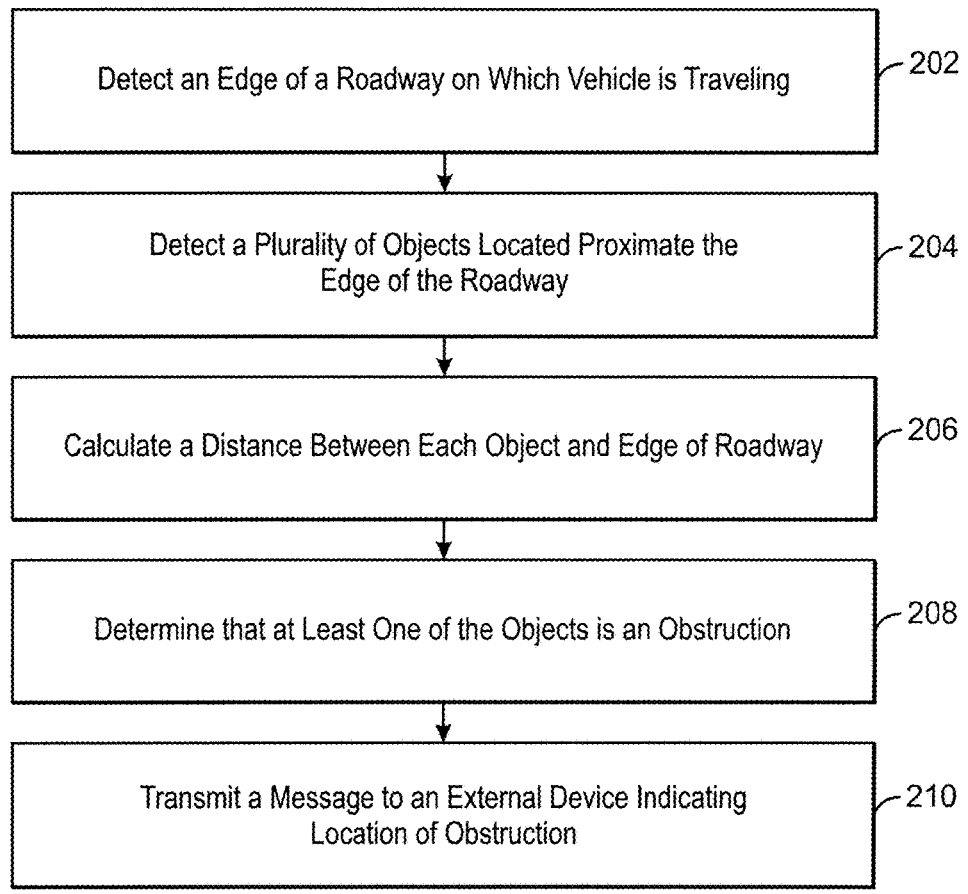
FIG. 2 is a process flow diagram of an example method that can detect obstructions, in accordance with embodiments of the present invention.

FIG. 2 is a process flow diagram of an example method that can detect obstructions, in accordance with embodiments of the present invention. The method 200 can be implemented with any suitable computing device, such as the computing device 100 of FIG. 1.

At step 202, the mapping module 124 can detect an edge of a roadway on which a vehicle is traveling. For example, the mapping module 124 can detect environmental data that indicates characteristics of the surrounding environment of a vehicle. In some examples, the environmental data can include information related to topography, road conditions, and road surfaces, etc. In some embodiments, the mapping module 124 can detect the edge of the roadway by detecting a change in the type of surface in the environmental data or by detecting a change in elevation of land surrounding the roadway.

At step 204, the mapping module 124 can detect a plurality of objects located proximate the edge of the roadway, based on captured image data. For example, the mapping module 124 can detect image data from any suitable camera, range finder, or any combination thereof. The mapping module 124 can detect and identify objects located proximate the edge of the roadway by comparing depth information associated with the edge of the roadway and the location of the objects located proximate the edge of the roadway. For example, the mapping module 124 can detect any number of objects that are located at a range that exceeds the edge of a roadway. In some examples, the mapping module 124 can request that additional data is to be collected for objects proximate the edge of a roadway. For example, the mapping module 124 can request that additional vehicles collect image data of the same object or the mapping module 124 can indicate that a camera or any other sensor is to move from a first position to a second position to capture image data from a different perspective. In some embodiments, the image data from different perspectives or heights can be aggregated to provide a more accurate location and size of an object.

At step 206, an obstruction module 126 can calculate a distance between each detected object and the edge of the roadway. For example, the obstruction module 126 can detect the difference in range between the location of each detected object and the edge of the roadway. In some embodiments, the obstruction module 126 can detect the distance between each detected object and the edge of a roadway based on information from any suitable range finder, such as a laser based range finder, motion sensing device, radar, and the like.

At step 208, the obstruction module 126 can determine that at least one object of the detected objects is an obstruction, based in part on the distance between at least one of the detected objects and the edge of the roadway being below a threshold. In some embodiments, the threshold can correspond to predetermined bylaws, sight lines, and any other suitable information. For example, bylaws can indicate a minimum distance to be enforced between the edge of a roadway and an object. In some embodiments, the obstruction module 126 can detect a sight line that is used to determine the threshold distance between the edge of a roadway and an object. For example, vehicles that approach and enter an intersection that intersects the roadway may need a minimum amount of space (also referred to herein as a sight line) between the edge of the roadway and objects proximate the edge in order to safely enter the intersection. In some examples, the sight line can be calculated based on a speed limit of a street perpendicular to the roadway at the intersection and the topography of the area surrounding the intersection. For example, the sight line can indicate the amount of space proximate the edge of a roadway that is to be free of objects. The sight line may increase based on higher speed limits, topography that limits the view of a vehicle, such as curves and hills, and the like. The obstruction module 126 can identify any object as an obstruction if the object resides within the sight line or within an area between the edge of the roadway and the distance from the edge that is to be free of objects.

In some embodiments, the obstruction module 126 can also identify objects as obstructions if the objects violate vertical restrictions indicated by bylaws and sight lines. For example, if a height of an object exceeds a predetermined height above ground level, the object may be considered to be an obstruction. In some examples, fences and other fixed objects that reside near the edge of a roadway can be considered obstructions if the fences or fixed objects violate a height restriction set forth in a bylaw or sight line.

At step 210, the warning module 128 can transmit a message to an external device, the message indicating a location of each detected object determined to be an obstruction. For example, the message can include global satellite positioning coordinates that correspond to the location of a detected object identified as an obstruction. In some embodiments, the message can be transmitted to any suitable external device such as a database, a server in a cloud service, or any other electronic device. In some examples, the message can also include information related to the sensors that captured the image data. For example, the message can also include information such as the ride height of the vehicle capturing the image data, the height of the camera and any other sensors located on the vehicle, velocity information of the vehicle, and/or global satellite information of the vehicle, etc.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, in some embodiments, the obstruction module 126 can filter objects identified proximate the edge of a roadway and are in motion. For example, the obstruction module 126 can detect that an object is in motion, which indicates that the object is not located in a fixed position. Accordingly, the object may correspond to an individual, an animal, or another vehicle such as a bicycle, and the like. In some embodiments, the obstruction module 126 can detect bylaw infractions based on a detected obstruction.

In some embodiments, the obstruction module 126 can modify an operation of a vehicle based on the obstruction. For example, the obstruction module 126 can stop the vehicle for a predetermined period of time, limit the acceleration of the vehicle as the vehicle enters an intersection, issue a warning to a driver and relinquish control of a vehicle to the driver, and the like.

Figure 3:
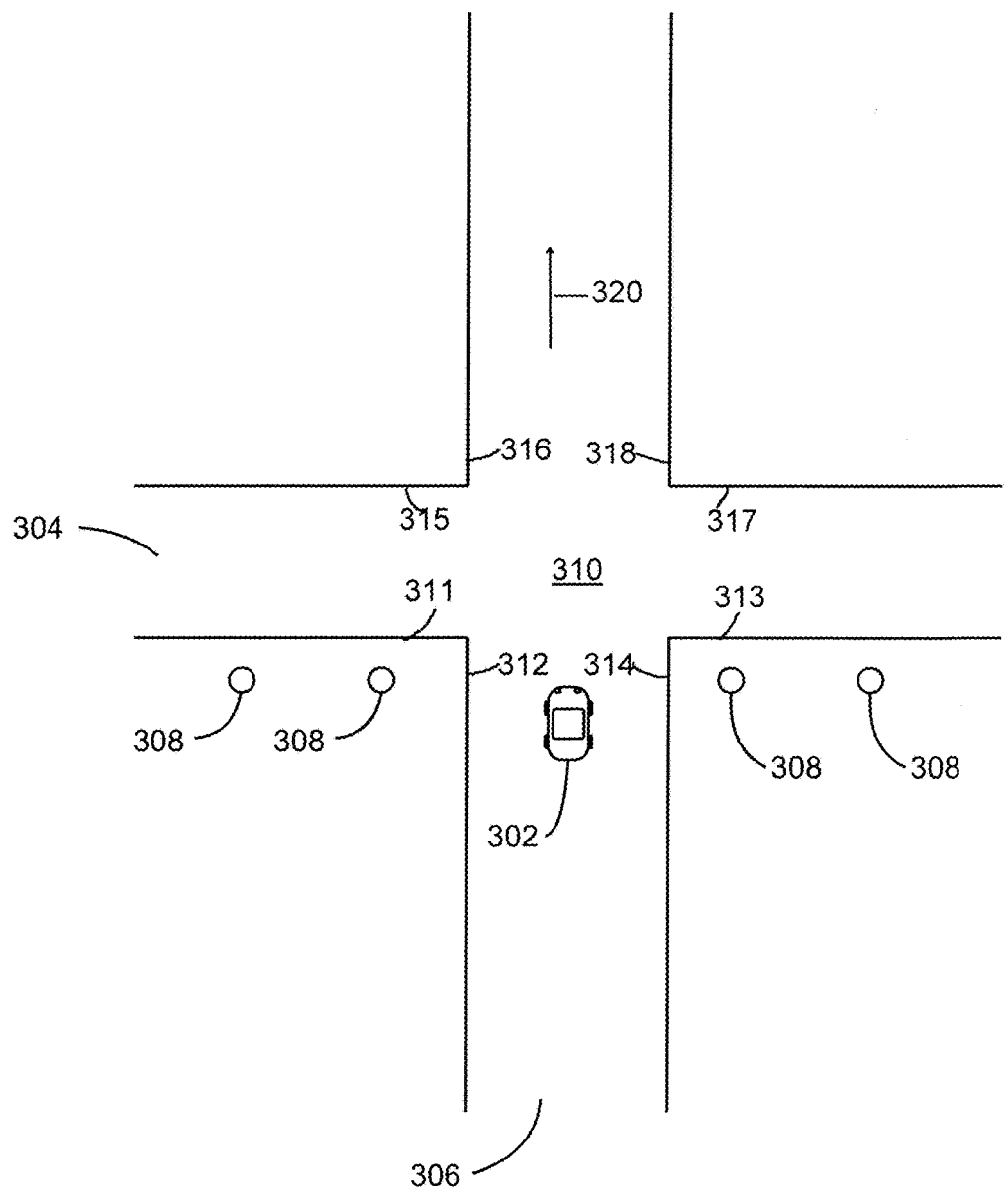
FIG. 3 is an example illustration of a roadway and proximate objects, in accordance with embodiments of the present invention.

FIG. 3 is an example illustration of a roadway and proximate objects, in accordance with embodiments of the present invention. The environment 300 surrounding vehicle 302 can include any suitable number of roadways 304 and 306. In some embodiments, the vehicle 302 can include any suitable computing device, such as the computing device 100 of FIG. 1. In some examples, the computing device 100 in the vehicle can detect obstructions 308 proximate the roadways approached by the vehicle 302 in which the computing device 100 is located. For example, the computing device 100 can determine a minimum threshold distance corresponding to a distance from the edge of a roadway that is to be free of obstructions. As discussed above, maintaining an area free of obstructions proximate the edge of a roadway can enable the computing device 100 to detect vehicles approaching the intersection on roadway (e.g., a perpendicular roadway).

In some embodiments, the computing device 100 can detect that a vehicle is approaching a perpendicular street 304 that is perpendicular to street 306, or an intersecting street that intersects a roadway at any possible angle, and calculate a sight line based on a predetermined speed limit of the perpendicular street. In some examples, a sight line can be modified based on a speed of the vehicle at a time the image data is captured. In some embodiments, the computing device 100 can collect the image data from a plurality of sensors, such as cameras, range finders, and the like, at different heights on the vehicle and aggregate the image data to detect a location and size (e.g, height) of an obstruction 308. Moreover, as discussed above, it is to be understood that computing device 100 can detect obstructions proximate a roadway along any portion of a road regardless of whether an intersection is nearby. For example, the computing device 100 can detect obstructions along a straight roadway, a curving roadway, and a roadway with a changing elevation or topography, and the like.

In one embodiment, the vehicle 302, which is moving along the roadway 306 in a direction 320, approaches an intersection 310 where roadways 306 and 304 intersect. The scope of "roadway" or "road" includes "street" or any other public path on which motorized vehicles (cars, trucks, motorcycles, etc.) may travel. In this embodiment, obstacles 308 (e.g., fences, trees, etc.) may be detected, via the sensors discussed supra, on one or more sides 311-318 proximate the intersection 310. The obstacles can be both permanent and temporary obstructions such as a construction sites, signs, etc. The obstructions may cause an obstructed view from the vehicle 302. The computing system 150 is configured to determine if an infraction has occurred due to the obstructions and/or obstructed view. The infraction may include a violation of a local bylaw or state/provincial/federal law and if so, the computing system 150 may generate an alert for communicating the infraction to a pertinent recipient (e.g., a government). For example, the alert may be transmitted to a government of a jurisdiction (e.g., town, city, county, state, etc.) having responsibility for intersection 310 and pertinent portions of the roadway/streets 306 and 304. In response to the alert, the government may dispatch a service provider (from within or from outside the government) to remove the obstructions and/or perform an action with respect to the obstructed view. For example, the action may be to modify the obstructions (e.g., if an obstruction is a tree, the action may be a trimming of the branches of the tree to mitigate the obstructed view). The computing system 150 may receive a communication (e.g., from the government) that the government has dispatched the service provider to remove the obstruction and/or perform the action with respect to the obstructed view.

Figure 4:
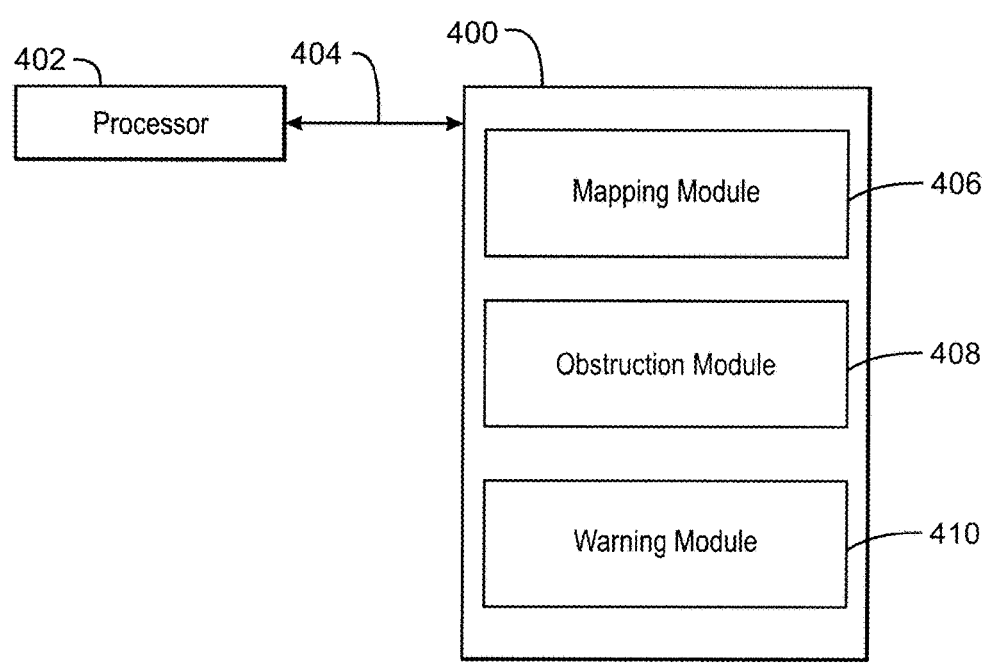
FIG. 4 depicts a computer-readable hardware storage medium or hardware storage device that may store software which upon being executed can detect obstructions, in accordance with embodiments of the present invention.

FIG. 4 depicts a computer-readable hardware storage medium or hardware storage device 400 that may store software which upon being executed can detect obstructions, in accordance with embodiments of the present invention. The storage medium or device 400 may be accessed by a processor 402 over a computer interconnect 404. Furthermore, the storage medium or device 400 may include program code to direct the processor 402 to perform the operations of the current method.

The various software components discussed herein may be stored on the storage medium or device 400, as indicated in FIG. 4. For example, a mapping module 406 can detect an edge of a roadway on which a vehicle is traveling and detect a plurality of objects located proximate the edge of the roadway based on captured image data. In some embodiments, an obstruction module 408 can calculate a distance between each detected object and the edge of the roadway and determine that at least one of the detected objects is an obstruction, based in part on the distance between at least one of the objects and the edge of the roadway being below a specified or predetermined threshold. In some examples, a warning module 410 can transmit a message to an external device (e.g., the external computing device 120), the message indicating a location of each detected object determined to be an obstruction.

It is to be understood that any number of additional software components not shown in FIG. 4 may be included within the storage medium or device 400, depending on the specific application.

The present invention improves the general technology of object detection, and more particularly the technology of detection of objects proximate an edge of a roadway.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention includes one or more computer readable hardware storage devices having compute readable program code stored therein, said program code containing instructions executable by one or more processors of a computing system (or computer system) to implement the methods of the present invention.

A computing system (or computer system) of the present invention includes one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system for detecting obstructions and modifying an operation of a vehicle in response thereto, said computing system comprising:
   a camera coupled to a vehicle and configured to capture image data; and
   a computing device that includes a processor configured to:
      detect an edge of a roadway on which the vehicle is traveling, based on the captured image data;
      detect a plurality of objects located proximate the edge of the roadway, based on the captured image data;
      determine a location of each detected object, based on the captured image data;
      calculate a distance between each detected object and the edge of the roadway;
      determine that at least one object of the detected objects is an obstruction, based on at least the calculated distance between each object of the at least one object and the edge of the roadway being below a threshold;
      transmit a message to an external device, said message indicating the location of each detected object determined to be an obstruction, and
      modify an operation of the vehicle based on the obstruction.

2. The computing system of claim 1, said computing system further comprising:
   a range finder to (i) calculate the distance between each detected object and the edge of the roadway and (ii) calculate a size and shape of each detected object.

3. The computing system of claim 1, wherein the camera is mounted at a predetermined location on the vehicle based on a ride height of the vehicle.

4. The computing system of claim 1, wherein said modify the operation of the vehicle is selected from the group consisting of stop the vehicle for a predetermined period of time, limit an acceleration of the vehicle as the vehicle enters an intersection, issue a warning to a driver of the vehicle, and relinquish control of the vehicle to the driver.

5. The computing system of claim 1, wherein the processor is configured to:
   determine that the vehicle is approaching an intersecting street; and
   calculate a sight line based on a predetermined speed limit of pertaining to the intersecting street.

6. The computing system of claim 1, wherein the processor is configured to:
   collect the image data from a plurality of sensors distributed at different heights on the vehicle; and
   aggregate the image data to detect the location of each detected object.

7. The computing system of claim 5, wherein the threshold is based in part on the sight line, the sight line to be modified based on a speed of the vehicle at a time the image data is captured.

8. The computing system of claim 1, wherein the obstruction is proximate an intersection where the roadway and a road intersect, wherein the obstruction causes an obstructed view from the vehicle, wherein said to transmit the message comprises to transmit an alert to the external device of a government of a jurisdiction having responsibility for the intersection, the roadway, and the road, and wherein the processor is configured to:
   determine that the obstruction and/or obstructed view is a violation of a law of the government; and
   receive a communication indicating that the government has, in response to the determination that the obstruction and/or obstructed view is a violation of a law of the government, dispatched a service provider to remove the obstruction and/or perform an action with respect to the obstructed view.

9. A method for detecting obstructions and modifying an operation of a vehicle in response thereto, said method comprising:
   detecting, by a processor of a computing device, an edge of a roadway on which a vehicle is traveling, based on captured image data;
   detecting, by the processor, a plurality of objects located proximate the edge of the roadway, based on the captured image data;
   determining, by the processor, a location of each detected object, based on the captured image data;
   calculating, by the processor, a distance between each detected object and the edge of the roadway;
   determining, by the processor, that at least one object of the detected objects is an obstruction, based on at least the calculated distance between each object of the at least one object and the edge of the roadway being below a threshold;
   transmitting, by the processor, a message to an external device, said message indicating the location of each detected object determined to be an obstruction and a height of a camera which captured the image data, and
   modifying, via the processor, an operation of the vehicle based on the obstruction.

10. The method of claim 9, said method comprising: calculating the distance between each detected object and the edge of the roadway, based on depth data collected from a range finder.

11. The method of claim 9, wherein the obstruction is proximate an intersection where the roadway and a road intersect, wherein the obstruction causes an obstructed view from the vehicle, wherein said transmitting the message comprises transmitting an alert to the external device of a government of a jurisdiction having responsibility for the intersection, the roadway, and the road, and wherein the method comprises:
   determining, by the processor, that the obstruction and/or obstructed view is a violation of a law of the government; and
   receiving, by the processor, a communication indicating that the government has, in response to the determination that the obstruction and/or obstructed view is a violation of a law of the government, dispatched a service provider to remove the obstruction and/or perform an action with respect to the obstructed view.

12. The method of claim 9, wherein said modifying the operation of the vehicle is selected from the group consisting of stopping the vehicle for a predetermined period of time, limiting an acceleration of the vehicle as the vehicle enters an intersection, issuing a warning to a driver of the vehicle, and relinquishing control of the vehicle to the driver.

13. The method of claim 9, said method comprising
   determining, by the processor, that the vehicle is approaching an intersecting street; and
   calculating, by the processor, a sight line based on a predetermined speed limit pertaining to the intersecting street.

14. The method of claim 9, said method comprising:
   collecting, by the processor, the image data from a plurality of sensors distributed at different heights on the vehicle; and
   aggregating, by the processor, the image data to detect the location of each detected object.

15. The method of claim 13, wherein the threshold is based in part on the sight line, the sight line to be modified based on a speed of the vehicle at a time the image data is captured.

16. A computer program product, comprising a computer readable hardware storage device having computer readable program code stored therein, said program code containing instructions executable by a processor of a system to implement a method for detecting obstructions and modifying an operation of a vehicle in response thereto, said method comprising:
   detecting, by the processor, an edge of a roadway on which a vehicle is traveling, based on captured image data;
   detecting, by the processor, a plurality of objects located proximate the edge of the roadway, based on the captured image data;
   determining, by the processor, a location of each detected object, based on the captured image data;
   calculating, by the processor, a distance between each detected object and the edge of the roadway;
   determining, by the processor, that at least one object of the detected objects is an obstruction, based on at least the calculated distance between each object of the at least one object and the edge of the roadway being below a threshold;
   transmitting, by the processor, a message to an external device, said message indicating the location of each detected object determined to be an obstruction; and
   modifying, via the processor, an operation of the vehicle based on the obstruction.

17. The computer program product of claim 16, wherein said modifying the operation of the vehicle is selected from the group consisting of stopping the vehicle for a predetermined period of time, limiting an acceleration of the vehicle as the vehicle enters an intersection, issuing a warning to a driver of the vehicle, and relinquishing control of the vehicle to the driver.

18. The computer program product of claim 16, said method comprising:
  determining, by the processor, that the vehicle is approaching an intersecting street; and
  calculate, by the processor, a sight line based on a predetermined speed limit pertaining to the intersecting street.

19. The computer program product of claim 16, said method comprising:
  collecting, by the processor, the image data from a plurality of sensors distributed at different heights on the vehicle; and
  aggregating, by the processor, the image data to detect the location of each detected object.

20. The computer program product of claim 16, wherein the obstruction is proximate an intersection where the roadway and a road intersect, wherein the obstruction causes an obstructed view from the vehicle, wherein said transmitting the message comprises transmitting an alert to the external device of a government of a jurisdiction having responsibility for the intersection, the roadway, and the road, and wherein the method comprises:
  determining, by the processor, that the obstruction and/or obstructed view is a violation of a law of the government; and
  receiving, by the processor, a communication indicating that the government has, in response to the determination that the obstruction and/or obstructed view is a violation of a law of the government, dispatched a service provider to remove the obstruction and/or perform an action with respect to the obstructed view.

* * * * *